US006488993B2

(12) United States Patent
Madigan

(10) Patent No.: US 6,488,993 B2
(45) **Date of Patent: *Dec. 3, 2002**

(54) PROCESS FOR APPLYING A COATING TO SHEET METAL

(76) Inventor: William V Madigan, 27 Washington Ave., P.O. Box 87, Bayville, NY (US) 11709

(*) Notice: Subject to any disclaimer, the term of this patent is extended or adjusted under 35 U.S.C. 154(b) by 0 days.

This patent is subject to a terminal disclaimer.

(21) Appl. No.: 09/416,921

(22) Filed: Oct. 13, 1999

(65) Prior Publication Data

US 2001/0002286 A1 May 31, 2001

Related U.S. Application Data

(63) Continuation-in-part of application No. 08/887,477, filed on Jul. 2, 1997, now Pat. No. 6,004,629.

(51) Int. Cl.[7] .................................................. C08F 2/46

(52) U.S. Cl. ...................... 427/496; 427/307; 427/327; 427/385.5; 427/409; 427/435; 427/551; 427/560; 427/600

(58) Field of Search ................................ 427/560, 600, 427/495, 551, 307, 327, 385.5, 409, 435

(56) References Cited

U.S. PATENT DOCUMENTS

| | | | | |
|---|---|---|---|---|
| 3,755,018 | A | 8/1973 | Miller | 148/6.21 |
| 3,895,969 | A | 7/1975 | Miller | 148/6.2 |
| 3,943,103 | A | 3/1976 | Borden et al. | 260/47 UA |
| 3,950,592 | A | 4/1976 | Hahn et al. | 428/463 |
| 3,959,521 | A | 5/1976 | Suetsugi et al. | 427/44 |
| 3,981,897 | A | 9/1976 | Crivello | 260/440 |
| 4,000,115 | A | 12/1976 | Jacobs | 260/47 EP |
| 4,026,705 | A | 5/1977 | Crivello et al. | 96/27 R |
| 4,058,401 | A | 11/1977 | Crivello | 96/115 R |
| 4,067,873 | A | 1/1978 | Troxler et al. | 260/288 D |
| 4,069,054 | A | 1/1978 | Smith | 96/115 P |
| 4,069,187 | A | 1/1978 | Miller | 260/29.6 M |
| 4,083,763 | A | 4/1978 | Matsuda et al. | 204/181 E |
| 4,088,621 | A | 5/1978 | Miller | 260/29.6 S |

(List continued on next page.)

FOREIGN PATENT DOCUMENTS

| | | | |
|---|---|---|---|
| DE | 1621598 | * | 8/1971 |
| DE | 44 21 558 A1 | | 12/1995 |
| EP | 0 540 884 A1 | | 10/1992 |
| GB | 1 276 695 | | 6/1972 |
| GB | 1 346 682 | | 2/1974 |
| JP | 51-10849 | * | 1/1976 |

OTHER PUBLICATIONS

"UV/EB Curing Primer 1", RadTech International North America, Jan. 1995, pp. 1–3, 11, 12.

Molenar, "New electron beam curing facility at TNO: perspectives for coil coating", European Polymers, Paint & Colour Journal, Mar. 1990, pp. 148.

(List continued on next page.)

*Primary Examiner*—Bernard Pianalto
(74) *Attorney, Agent, or Firm*—Harry L. Newman

(57) ABSTRACT

A process for coating a moving length of sheet metal is disclosed that includes the steps of 1) cleaning the moving length of sheet metal to remove surface contaminants that may interfere with the coating adhering to the sheet metal; 2) applying an electron beam curable coating to the moving length of sheet metal; and, 3) exposing the coating on the moving length of sheet metal to an electron beam to cure the coating, the cleaning, coating and curing resulting in no emission of pollutants that need to be removed before the emission is released into the atmosphere.

8 Claims, 3 Drawing Sheets

U.S. PATENT DOCUMENTS

| | | | | | |
|---|---|---|---|---|---|
| 4,102,869 | A | * | 7/1978 | Tobias et al. | |
| 4,103,050 | A | | 7/1978 | Laskin et al. | 427/379 |
| 4,137,368 | A | | 1/1979 | Miller | 428/461 |
| 4,138,276 | A | | 2/1979 | Miller | 148/6.2 |
| 4,161,478 | A | | 7/1979 | Crivello | 260/327 B |
| 4,180,598 | A | | 12/1979 | Emmons | 427/44 |
| 4,246,298 | A | | 1/1981 | Guarnery | 427/46 |
| 4,410,560 | A | | 10/1983 | Kosterka | 427/44 |
| 4,428,807 | A | | 1/1984 | Lee et al. | 204/159.14 |
| 4,481,258 | A | | 11/1984 | Sattler | 428/371 |
| 4,503,198 | A | | 3/1985 | Miyai et al. | 525/440 |
| 4,527,901 | A | * | 7/1985 | Cook | |
| 4,571,316 | A | | 2/1986 | Naruse et al. | 264/22 |
| 4,748,087 | A | | 5/1988 | Davidson et al. | 428/463 |
| 4,788,992 | A | | 12/1988 | Swainbank et al. | 134/64 |
| 5,128,387 | A | | 7/1992 | Shustack | 522/92 |
| 5,128,391 | A | | 7/1992 | Shustack | 522/92 |
| 5,486,384 | A | | 1/1996 | Bastian et al. | 427/493 |
| 5,532,027 | A | | 7/1996 | Nordstrom et al. | 427/493 |
| 5,558,735 | A | | 9/1996 | Rettew et al. | 156/275.5 |
| 5,747,115 | A | | 5/1998 | Howell et al. | 427/496 |

OTHER PUBLICATIONS

Smit, et al, "Investigations on the Adhesion of EB cured coatings on Metal Substrates", TNO Centre for Coating Research, about 1992 (no month avail.).

"Electron Beam Basics", Energy Sciences Inc. trade literature, 1994, pp. 1–8 (no month avail.).

Sitzmann et al, Combining Vinyl Ethers with Epoxies for Enhanced performance in UV Cured Coatings, Radtech Report, Mar./Apr. 1998.

Pennington, "Compact washer fits coil procesing lines", Modern Metals, Jan. 1997.

"Flat Metal Cleaning", A.D.S. Machinery Corporation trade literature, Mar. 1997 or earlier.

Sitzmann, E.V., Anderson, R.F., Cruz, J.G., Proszowski, M.J., Patel, A.B., Bratllavsky, S.A. and Braldley, D.E.; "Combining Vinyl Ehers with Epoxies for Enhanced Performance in UV Cured Coating", Radtech Report Mar./Apr. 1998, pp. 37–48.

Maisek, G. M.; "Development of Electron Curable Coatings for Prepared Painted Strip", Surface Coatings International 1996 (6), pp. 258–267 (no month avail.).

Gaynor Miasik, British Steel Strip Products Welsh Technical Centre; "Development of Electron Beam Curable Coating for Prepainted Strip", Fifteenth International Conference; The Future of Industrial Coatings 1995 (no month avail.).

* cited by examiner

PROCESS FOR APPLYING A COATING TO SHEET METAL

CROSS-REFERENCE TO RELATED APPLICATION

This is a continuation in part of patent application Ser. No. 08/887,477 filed Jul. 2, 1997, U.S. Pat. No. 6,004,629.

FIELD OF THE INVENTION

This invention is directed to the field of coating sheet metal and more particularly, to a process for coating sheet metal that does not result in the emission of pollutants that need to be removed before the emission is released into the atmosphere.

BACKGROUND OF THE INVENTION

The traditional method of coating sheet metal is to apply a solvent or water-based coating to the sheet metal, and then move the sheet metal through an oven to cure the coating. The curing is accomplished by heating the sheet metal and the coating to a temperature at which the solvent or water in the coating is evaporated and at which the coating itself is not harmed. To obtain a uniform coating and for greatest efficiency and lowest cost, the curing is a continuous process in which 1) the oven needs to be maintained at a constant temperature, 2) the sheet metal needs to be continuous and 3) the sheet metal needs to be moved through the oven at a constant rate of speed. A typical rate is 200 to 400 feet per minute.

To meet the requirement that the sheet metal be continuous, two pay off coils of sheet metal and a welder/joiner are typically provided. The sheet metal is advanced from one of the pay off coils, and when the end of that coil is reached, it is welded to the beginning of the second pay off coil. Then, as sheet metal is advanced from the second coil, the exhausted first coil is replaced. In addition, after the coating on the sheet metal is cured, the sheet metal needs to be re-coiled. To accomplish this, a shear and two re-coil mechanisms are typically provided. The continuously moving sheet metal is wound on a first re-coil mechanism, and when the desired coil size is reached, the sheet metal is cut by the shear. The sheet metal is then wound on the second re-coil mechanism while the coil on the first re-coil mechanism is removed.

Both the welding/joining operation at the beginning of the process and the shearing operation at the end of the process require interruption of the movement of the sheet metal. Therefore, to satisfy the requirement that the sheet metal move through the oven at a constant rate of speed, it is necessary that a first excess length of sheet metal be provided after the welder/joiner. This excess length of sheet metal is fed into the process during the time that the welding/joining operation is taking place and no sheet metal is being advanced from one of the pay off coils. It is apparent that even at the modest rate of speed of 200 to 400 feet per minute, allowing for the worst case interruption requires that the excess length of sheet metal be substantial.

This excess length of sheet metal is provided by apparatus referred to as an accumulator. This accumulator is typically a tower within which the excess sheet metal is vertically looped back and forth on itself in serpentine fashion. The ends of the loops are wrapped around rollers that move toward one another to shorten the loops when excess length is being used to replace the sheet metal not being provided by a pay off coil. Once the welding/joining operation is completed, the rollers move away from one another as the desired excess length is restored in the accumulator.

A second accumulator needs to be provided before the shear and re-coil mechanisms. This is because the sheet metal is continuously moving out of the oven at the constant rate of speed. During the time when the winding of the sheet metal is being transferred from one of the re-coil mechanisms to the other, the sheet metal needs to be accumulated. In the second accumulator, the length of the loops are increased when no re-coil mechanism is in operation and decreased when a re-coil mechanism is in operation.

The oven used in the traditional method needs to be of considerable length in order to effect complete curing of the coating applied to the sheet metal. A length of 100 feet for sheet metal of 0.050 thickness moving at a rate of 200 to 400 feet per minute is appropriate. Of course, the length of the oven needs to be increased if the thickness of the sheet metal and/or the rate at which the sheet metal moves through the oven is increased.

Prior to the coating being applied to the sheet metal, the sheet metal needs to be cleaned to remove contaminants that may interfere with the coating adhering to the sheet metal and pretreated to promote adhesion of the coating to the sheet metal. In the traditional method the materials used in the cleaning of the sheet metal contain pollutants in the form of volatile organic compounds that are emitted during the cleaning operation. In addition, the materials used in the pretreating of the sheet metal may also contain such pollutants. These pollutants need to be removed before the emissions can be released to the atmosphere.

Similarly, the coating used in the traditional method contain volatile organic compounds and hazardous air pollutants that are emitted during the curing operation. Again, these pollutants need to be removed before the emissions can be released to the atmosphere. It is, therefore, necessary in the traditional method to have in place pollution control equipment that removes these pollutants from the emissions exhausted from the cleaning operation, the pretreating operation, and the curing operation.

It is seen from the above that the traditional method for coating sheet metal has many deficiencies. First, it requires large amounts of equipment and a building of substantial size to house the equipment. Thus, it requires a significant investment of capital. Second, without a substantial increase in capital investment, it is a relatively low speed process. Third, it only lends itself to long runs. A coating line needs to operate around the clock for days or weeks once coating of sheet metal with a coating of a particular color has begun. Fourth, because of this and the many pieces of equipment involved in this process, the cost of operation and maintenance is significant. Last, and most importantly, it requires the installation of pollution control equipment to prevent pollution of the atmosphere.

SUMMARY OF THE INVENTION

The sheet metal coating process, in accordance with the present invention, provides very significant advantages over the traditional coating method.

The process, in accordance with the present invention, uses an electron beam curable coating rather than a heat curable coating. Consequently, the curing oven is eliminated along with the need to have a continuous length of sheet metal moving at a constant rate of speed. As a result, the second pay off mechanism, the two accumulator towers, and the second re-coil mechanism are all unnecessary. If individual sheets rather than a coil is being coated, then the welder/joiner and shear can also be eliminated. The equipment necessary to carry out the sheet metal coating process in accordance with the present invention is, therefore, far less costly than that required for the traditional method. In addition, because there is less equipment than in the traditional method, the cost of operating and maintaining the equipment is also reduced.

Another advantage of the coating process in accordance with the present invention is the rate of speed at which the sheet metal can be coated. Without increasing the cost of the equipment from that stated above, the sheet metal can be coated and cured at a rate of speed of 600 to 800 feet per minute. To provide this same rate with the traditional method would result in the equipment cost almost doubling.

Still another advantage of the coating process in accordance with the present invention is that it can accommodate not only long production runs, but also short ones. With the coating used in the traditional method, the coating cures even at ambient temperatures. The coating used in the present invention, on the other hand, only cures when it is exposed to an electron beam. Thus the system can be purged, the coating recovered, and the equipment that applies the coating to the sheet metal readily cleaned. Consequently a single coil can provide a continuous length of sheet metal and the movement of the sheet metal can be interrupted. The process in accordance with the present invention can, therefore, be used to do short custom runs. It can also be used to provide coated sheet metal in small batches on a just-in-time basis. This allows the purchaser to reduce their inventory and save money.

Most importantly, the coating process of the present invention is environmentally friendly in that it does not result in the emission of pollutants. The term “pollutant” as used in this patent is defined to mean anything characterized by the U.S. Environmental Protection Agency (EPA) as an air pollutant that exceeds limits established by the EPA.

The cleaning of the sheet metal to remove contaminants, in accordance with one embodiment of this invention, is accomplished ultrasonically. This is a water based, rather than solvent based, technology, and biodegradable aqueous detergents are available as an additive to the water washing solution. Following the washing of the sheet metal, it is given a clean water rinse and then dried. This cleaning operation does not result in the emission of pollutants. Another example of a non-solvent based cleaning technology is high turbulence circular flow nozzles which apply a water based cleaning solution to the sheet metal.

Pretreatment of the sheet metal is typically performed to promote adhesion of the coating to the sheet metal, and in accordance with one embodiment of this invention, the pretreatment is accomplished using a water based, rather than a solvent based, pretreatment solution that does not emit pollutants.

Pretreatment solutions when dried may also improve corrosion resistance . But where corrosion resistance is important to the product in which the coated sheet metal is to be used, a primer may be applied to the sheet metal subsequent to the pretreatment of the sheet metal. While the primary function of the primer is to enhance corrosion resistance, in some cases it also enhances adhesion of the coating to the sheet metal. Consequently, in some applications the primer may be used in place of the pretreatment. The primer in accordance with the present invention is either water based or electron beam curable.

Finally, it has been found that some electron beam curable top coatings have sufficient adherence directly to the cleaned sheet metal that for some applications no pretreatment or primer need be applied.

Coating of the sheet metal is accomplished using electron beam technology rather than an oven which cures the coating by evaporating the liquid in the coating. During the electron beam processing, molecules in the coating are irradiated with electrons and the coating is transformed into a solid through the process of polymerization and crosslinking. The transformation of the coating into a solid is virtually instantaneous and produces no emissions.

Thus, it is seen that the cleaning, pretreating and/or priming of the sheet metal and the curing of the coating does not result in the emission of pollutants that need to be removed before the emission is released to the atmosphere.

BRIEF DESCRIPTION OF THE DRAWINGS

The sheet metal coating process in accordance with the present invention will be more fully described with reference to the following drawing figures of which.

DETAILED DESCRIPTION OF THE INVENTION

Figure 1:
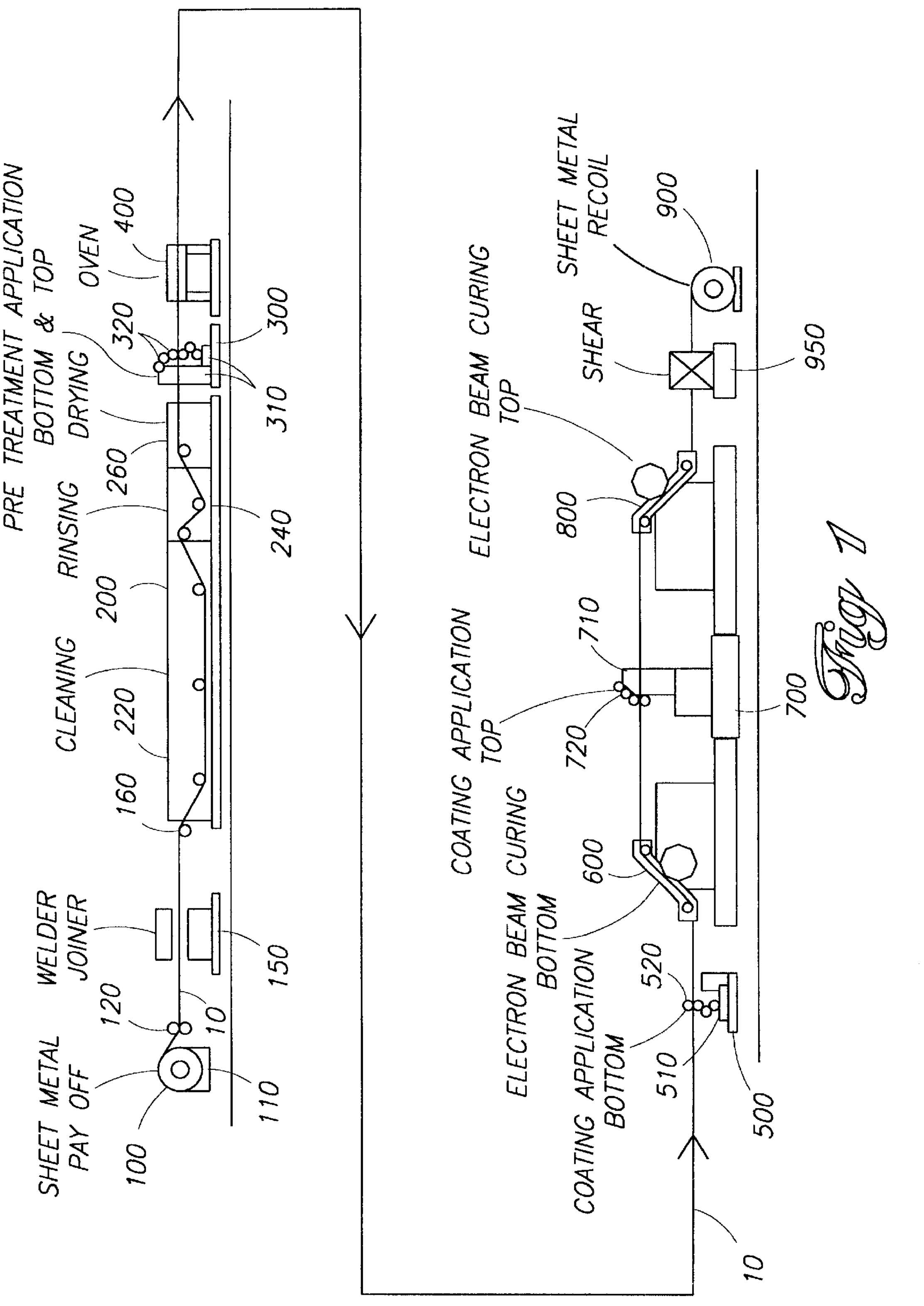
FIG. 1 is a schematic drawing illustrating one application of the process of the present invention.

FIG. 1 illustrates the application of the process of the present invention to the coating of both sides of a coil of sheet metal. Sheet metal 10 is advanced from a coil 100 mounted on pay off apparatus 110 and moved through a welder joiner 150 via rollers 120. The welder/joiner 150 serves to join the tail end of an exhausted coil with the beginning end of a fresh coil. This avoids having to manually thread the beginning end of the fresh coil through the system. Such equipment is available from Newcor in Bay City, Mich. From the welder/joiner the sheet metal 10 moves via rollers 160 into cleaning apparatus 200. The function of the cleaning apparatus 200 is to remove surface contaminants that may interfere with the coating, which is subsequently applied to the sheet metal 10, from adhering to the sheet metal. These contaminants include dirt, oil and grease. This cleaning operation is accomplished in three steps: first, the surface of the sheet metal 10 is cleaned; second, the surface is rinsed; and third, the surface is dried in preparation for the next step in the process.

Figure 2:
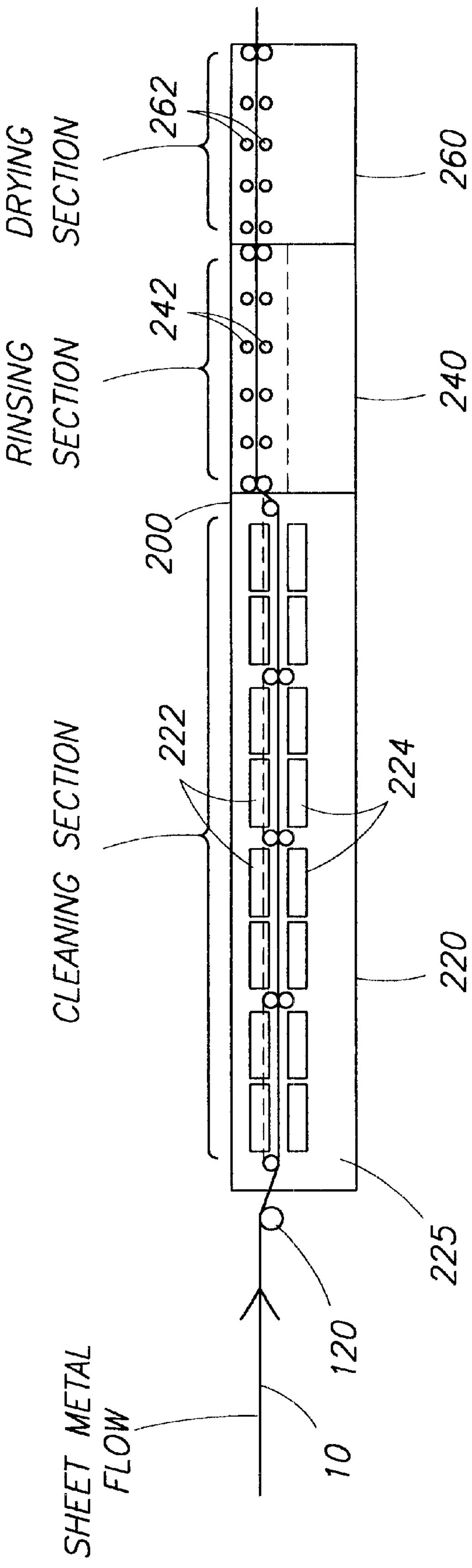
FIG. 2 is a schematic drawing illustrating ultrasonic cleaning apparatus.

Referring to FIG. 2, one embodiment of cleaning apparatus 200 for performing the cleaning operation without resulting in the emission of pollutants is shown. The cleaning apparatus 200 comprises an ultrasonic cleaning section 220, rinsing section 240, and a drying section 260. The cleaning section 220 includes multiple pairs of opposing ultrasonic transducers 222 and 224. The ultrasonic transducers 222 and 224 are closely spaced and operate at different frequencies. Both the sheet metal 10 and a washing solution 225 move through the space between the opposing faces of each pair of ultrasonic transducers 222 and 224. The operation of the ultrasonic transducers 222 and 224 in combination with the washing solution 225 provides ultrasonic cleaning of both sides of the sheet metal 10. The washing solution 225 can be just water or a mild emulsifying soap or biodegradable aqueous detergent can be added to the water to enhance the cleaning action of the ultrasonic transducers 222 and 224. The sheet metal 10 and washing solution 225 advantageously move in opposite directions, the washing solution carrying away the contaminants and flowing into a collector chamber from which it is drained, filtered and recirculated.

The sheet metal 10 moves from the cleaning section 220 into the rinsing section 240. In this section multiple pairs of opposed rinse water nozzles 242 spray both surfaces of the sheet metal 10, the nozzles comprising each pair being on opposite sides of the sheet metal. As the sheet metal 10 moves between successive pairs of rinse nozzles 242, any of the washing solution 225 remaining on the sheet metal is removed. The rinse water applied by the initial pairs of nozzles 242 may be recirculated while the rinse water applied by the final pairs of nozzles may be fresh water.

In the final step of the cleaning process, the sheet metal 10 is moved into the drying section 260. In the section multiple pairs of opposed air knives 262 are used to blow the rinse water off of both surfaces of the sheet metal 10, the air knives comprising each pair being on opposite sides of the sheet metal. Compressed air, which is heated as a result of its compression, is advantageously provided to the air knives 262. As a result, the sheet metal 10 leaving the drying section 260 is essentially dry. A more detailed description of ultrasonic strip cleaning apparatus is provided in U.S. Pat. No. 4,788,992.

Another example of non-solvent based cleaning apparatus is disclosed in an article entitled "Compact washer fits coil processing lines" published January 1997 in Modem Metals. This apparatus includes high turbulence circular flow nozzles to apply miniature tornadoes of water based cleaning solution to the sheet metal to remove contaminants from the surface of the sheet metal.

Referring again to FIG. 1, the sheet metal 10 leaving the cleaning apparatus 200 moves on to pretreatment solution application apparatus 300. The pretreatment solution application apparatus 300 includes two pretreatment solution reservoirs 310. Each pretreatment solution reservoirs 310 is associated with a group of interacting rollers 320 for picking up the pretreatment solution from the reservoir and applying it to one side of the sheet metal 10. The rollers 320 respectively associated with the pretreatment solution reservoirs 310 are on opposite sides of the sheet metal 10, and therefore, the pretreatment solution is applied to both sides of the sheet metal as it moves through the pretreatment solution application apparatus 300.

The pretreatment solution applied to the sheet metal 10 is then dried by moving the sheet metal through an oven 400, that uses infrared heating elements, such as one manufactured by BGK, an Illinois Tool Works Company in Minneapolis, Minn. This pretreatment of the sheet metal 10 serves to promote adhesion of the subsequently applied coating to the sheet metal surfaces. In accordance with the present invention, the pretreatment solution that is applied to the sheet metal 10 comprises a water based, rather than a solvent based, material that does not emit pollutants when it is applied and dried. Examples of such products are Chromate, Zinc Phosphate and Iron Phosphate.

While the primary function of the pretreatment solution once dried is to enhance adhesion of the top coating to the sheet metal, the pretreatment material may also provide some corrosion resistance to the finished product. However, when corrosion resistance is important to the finished product, then the application of a primer is appropriate. The primary function of a primer is to enhance the corrosion resistance of the finished product, and it is applied in the same way as the pretreatment solution.

Thus where the finished product requires both the application of a pretreatment solution and a primer, the pretreatment solution apparatus 300 is replicated after the oven 400 to apply the primer over the dried pretreatment material. To avoid pollutants the primer is non-solvent based. Thus it may be either water based or electron beam curable. If it is water based, then the oven 400 is also replicated following the primer application apparatus. If the primer is electron beam curable, then the electron beam curing apparatus 600, subsequently described, is replicated following the primer application apparatus. Water based primers include epoxy, urethane, polyester alkyds, acrylites and vinyls. An example of a water based primer is Strathmore W80-02001 available from Strathmore Products, Inc. An example of an electron beam curable primer is Strathmore 59AP99-1 also available form Strathmore Products, Inc.

While, as stated above, the primary function of a primer is to enhance corrosion resistance, the primer may also enhance adhesion to the sheet metal. The Strathmore W80-02001 is an example of such a primer. Thus in some applications the pretretment step may be simply replaced by the primer step.

After both sides of the sheet metal 10 have been pretreated and/or primed, the sheet metal moves to coating apparatus 500. The coating apparatus 500 includes a coating reservoir 510 and a group of interacting rollers 520 that pick up an electron beam curable coating from the reservoir and apply it to the bottom surface of the sheet metal 10. Examples of such a coating that have been found to achieve a good bond to the sheet metal 10 once curing is completed are Strathmore 77-98-5, 85-98-6, 84-98-2, and 85-98-6A available from Strathmore Products, Inc. and Polyset 24-71A and 24-71B available from Polyset Company Inc.

Furthermore, it has been found that the electron beam curable coating may adhere directly to the cleaned sheet metal without the assistance of the pretreatment material or the primer. Thus in some applications the electron beam curable coating may be applied directly to the cleaned sheet metal. An example of such a coating is the Strathmore 85-98-6.

Figure 3:
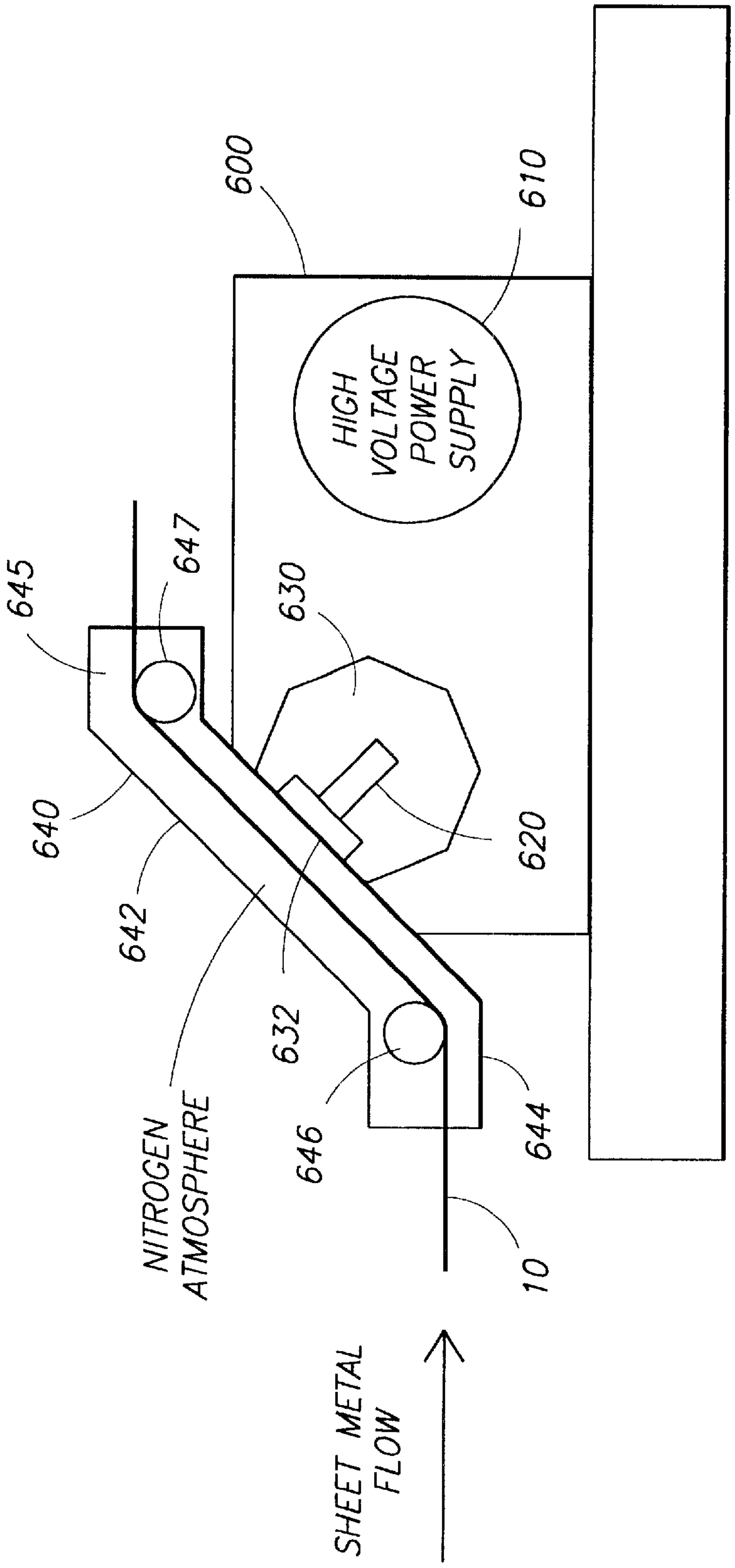
FIG. 3 is a schematic drawing illustrating electron beam curing apparatus.

Referring now to FIG. 3, after the application of the coating, the sheet metal moves to electron beam curing apparatus 600. The electron beam curing apparatus 600 comprises a high voltage power supply 610 that provides power to an electron gun assembly 620, positioned within a vacuum chamber 630 having a foil window 632 on one side. The foil window 632 is mounted on the underside of a center portion 642 of a conduit 640. The center portion 642 extends at an angle to an entrance portion 644 and an exit portion 645 at each end of the center portion, the entrance and exit portions extending generally parallel to one another. Rollers 646 and 647 respectively positioned within the entrance portion 644 and exit portion 645 serve to guide the movement of the sheet metal 10 through the conduit 640.

The electron gun assembly 620 includes tungsten filaments (not shown) and when high voltage is applied to the filaments, a cloud of electrons is generated. Electrons are drawn from the cloud to areas of lesser voltage of the gun assembly, and the electrons accelerate to extremely high speeds. The electrons exit the vacuum chamber through and generally perpendicular to the foil window 632 and penetrate the coating of the underside of the sheet metal 10 moving through the conduit 640. As a result, the coating is transformed into a solid through the process of polymerization and crosslinking. Electron beam polymerization is the process in which several individual groups of molecules combine together to form one large group called a polymer. Electron beam crosslinking is the process by which an interconnected network of chemical bonds or links develop between polymer chains to form a stronger molecular structure. Many coatings require a low oxygen environment during electron beam processing to be able to convert from a liquid like state to a solid. Therefore, for these coatings nitrogen gas is pumped into the conduit 640 through jets (not shown) to displace the oxygen that would prevent complete curing. Finally, the shape of the conduit 640 serves to prevent electrons from escaping through the entrance and exit ports 644 and 645. Electron beam curing apparatus of the type described is manufactured by Advanced Electron Beams Inc. and Energy Sciences Inc. both in Wilmington, Mass. and RPC Industries in Haywood, Calif.

Referring again to FIG. 1, the sheet metal 10 leaving the electron beam curing apparatus 600 moves to coating apparatus 700. The coating apparatus 700 includes a coating reservoir 710 and a group of interacting rollers 720 that pick up an electron beam curable coating from the reservoir and apply it to the top surface of the sheet metal 10. The sheet metal 10 then moves to electron beam curing apparatus 800.

The electron beam curing apparatus 800 is the same as electron beam curing apparatus 600 previously described except that the orientation is changed to apply the electron beam to the top surface of the sheet metal 10 to cure the coating applied by the coating apparatus 700.

The final step of the process is to rewind the sheet metal 10 into a coil. This is accomplished by the sheet metal re-coil apparatus 900. A shear 950 is advantageously located before the re-coil apparatus 900 to cut the sheet metal 10 when the coil on the re-coil apparatus has reached the appropriate size. Such a shear is available from Hallden America in Thomaston, Conn.

While the preferred embodiment of this invention has been described in the Detailed Description, the scope of the invention is defined in the following claims. It is clear, however, that while the steps recited in the claimed process are performed sequentially, they do not need to be performed at a single location. Thus, for example, a coil of sheet metal can be uncoiled to provide a continuous moving length of sheet metal that is cleaned, pretreated and/or primed. This length of sheet metal can then be recoiled and moved to another location where it is uncoiled again to provide a continuous moving length of sheet metal on which the rest of the steps of the recited process are then performed to complete the process.

What is claimed is:

1. A process for coating a surface of a moving length of sheet metal comprising the steps of:

Advancing the sheet metal at a rate no less than 250 feet per minute;

Cleaning the surface of the moving length of sheet metal using a non-solvent based technology to remove surface contaminants that may interfere with the coating adhering to the surface of the sheet metal;

Applying an electron beam curable coating directly to the cleaned metal surface of the moving length of sheet metal; and Exposing the electron beam curable coating on the moving length of sheet metal to an electron beam to cure the coating, the coating itself when cured adhering to and being in direct contact with the metal surface of the sheet metal.

2. A process for coating a surface of a moving length of sheet metal as in claim 1 wherein the sheet metal is advanced at a rate in excess of 600 feet per minute.

3. A process for coating a surface of a sheet metal coil comprising the steps of:

Advancing the sheet metal from the coil to provide a continuous length of sheet metal moving at a rate no less than 250 feet per minute;

Cleaning the surface of the moving length of sheet metal using non-solvent based technology to remove surface contaminants;

Applying a non-solvent based primer directly to the cleaned metal surface of the moving length of sheet metal, the primer improving corrosion resistance;

Applying an electron beam curable coating directly to the primer; and

Exposing the electron beam curable coating to an electron beam to cure the coating.

4. The process as in claim 3 wherein the primer is water based.

5. The process as in claim 4 further including the step of:

Drying the primer prior to applying the electron beam curable coating.

6. The process as in claim 3 wherein the primer is electron beam curable.

7. The process as in claim 6 further including the step of:

Exposing the primer to an electron beam to cure the primer prior to applying the electron beam curable coating.

8. A process for coating a surface of a sheet metal coil as in claim 3 wherein the sheet metal from the coil is advanced to provide a continuous length of sheet metal moving at a rate in excess of 600 feet per minute.

* * * * *